(12) United States Patent
Yamada et al.

(10) Patent No.: US 7,135,800 B2
(45) Date of Patent: Nov. 14, 2006

(54) AXIAL GAP ELECTRONIC MOTOR

(75) Inventors: Masaki Yamada, Kawasaki (JP); Hisao Igarashi, Kawasaki (JP); Kenji Narita, Kawasaki (JP); Takushi Fujioka, Kawasaki (JP); Tomonori Kojima, Kawasaki (JP); Shinichiro Katagiri, Kawasaki (JP); Shinichi Yamada, Kawasaki (JP); Yoichi Tanabe, Kawasaki (JP); Hidetaka Terakubo, Kawasaki (JP); Takayuki Shinohara, Kawasaki (JP)

(73) Assignee: Fujitsu General Limited, Kawasaki (JP)

( * ) Notice: Subject to any disclaimer, the term of this patent is extended or adjusted under 35 U.S.C. 154(b) by 0 days.

(21) Appl. No.: 11/010,416

(22) Filed: Dec. 14, 2004

(65) Prior Publication Data
US 2005/0140244 A1    Jun. 30, 2005

(30) Foreign Application Priority Data
Dec. 24, 2003   (JP)  ............................ 2003-426369

(51) Int. Cl.
*H02K 1/00*     (2006.01)
(52) U.S. Cl. .................. 310/216; 310/254; 310/268
(58) Field of Classification Search ................ 310/216, 310/218, 268, 254
See application file for complete search history.

(56) References Cited

U.S. PATENT DOCUMENTS

| | | | | | |
|---|---|---|---|---|---|
| 3,296,475 | A | * | 1/1967 | Parker | 310/268 |
| 3,699,372 | A | * | 10/1972 | Abe et al. | 310/268 |
| 4,410,820 | A | * | 10/1983 | Stanley | 310/216 |
| 4,959,578 | A | * | 9/1990 | Varga | 310/268 |
| 5,665,944 | A | * | 9/1997 | Aulanko et al. | 187/277 |
| 5,814,914 | A | * | 9/1998 | Caamano | 310/216 |
| 5,837,948 | A | * | 11/1998 | Aulanko et al. | 187/277 |
| 5,982,070 | A | * | 11/1999 | Caamano | 310/216 |
| 6,346,759 | B1 | * | 2/2002 | Suzuki et al. | 310/254 |
| 6,809,453 | B1 | * | 10/2004 | Narita et al. | 310/216 |
| 6,853,105 | B1 | * | 2/2005 | Nakano et al. | 310/156.47 |
| 2005/0073213 | A1 | * | 4/2005 | Naito et al. | 310/218 |

* cited by examiner

*Primary Examiner*—Tran Nguyen
(74) *Attorney, Agent, or Firm*—Manabu Kanesaka (57) ABSTRACT

An axial gap electronic motor includes a stator having a plurality of poles, and a rotor. Each pole is formed of a stator iron core made of a magnet body and a coil wound therearound. The rotor has a plurality of poles formed of permanent magnet and arranged along a rotation axis direction of said rotor with a predetermined gap provided therebetween. The stator has a magnetic force generating section in which a plurality of the stator iron cores is arranged in a ring shape on a concentric circle with the rotation axis line of the rotor being a center axis. Each of teeth of the stator iron core is provided with a skew.

10 Claims, 7 Drawing Sheets

AXIAL GAP ELECTRONIC MOTOR

TECHNICAL FIELD

The present invention relates to an axial gap electronic motor in which a stator and a rotor are arranged oppositely along the axial direction of an output shaft. More particularly, it relates to a stator iron core structure capable of decreasing cogging torque.

BACKGROUND ART

In an axial gap electronic motor, as disclosed in, for example, Patent Document 1 (Japanese Patent Application Publication No. 2000-253635), a rotor and a stator are arranged oppositely along the axial direction of an output shaft with a predetermined gap provided therebetween. The axial gap electronic motor can be designed so as to be thin as compared with the ordinary motor. For this reason, the motor of this type is preferably used as a hub motor for a power assisted bicycle, a driving motor for an FD drive, and the like.

In a brushless motor made up of a stator iron core made of a magnetic material and a magnet rotor, when the magnetic resistance between the rotor and the stator is changed by the rotation of rotor, cogging torque is produced by attraction and repulsion in the rotation direction. If this cogging torque is high, vibrations and noise occur.

Especially in the case of the axial gap electronic motor, design is made so that the gap between the rotor and the stator is very narrow. Therefore, there is a fear that the rotor is brought into contact with the stator by vibrations, which may provide a cause of breakage, etc.

Thereupon, as one method for decreasing the cogging torque, a stator iron core structure in which a skew (slope) is provided on a stator iron core has been used. Specifically, the skew can achieve an effect of decreasing cogging torque by tilting a part of stator iron core through a predetermined angle along the direction of rotation of the rotor. On the other hand, however, the skew has a drawback of decreased efficiency of conversion to rotational energy.

Figure 6:
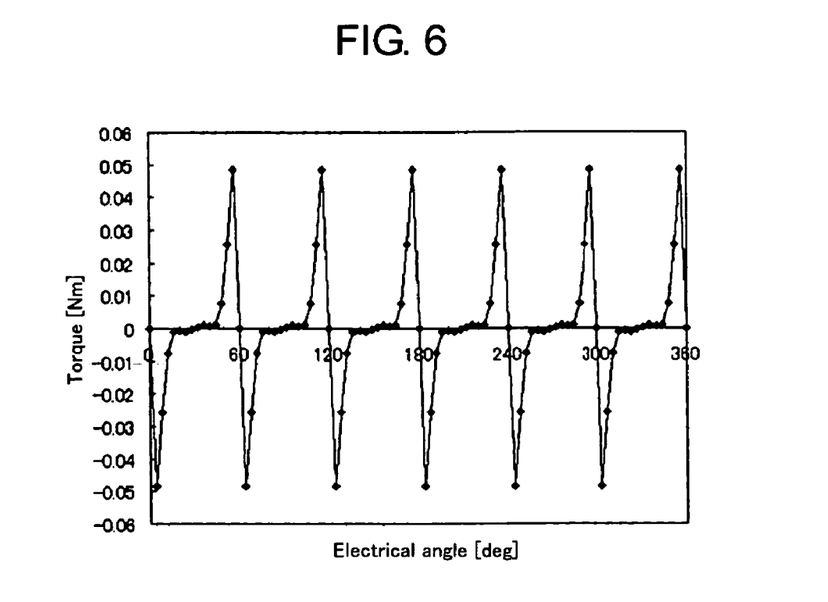
FIG. 6 is a graph showing the relationship between cogging torque and electrical angle in the case of no skew angle in a first example (12 slots, 8 poles)

In the axial gap electronic motor, the stator iron core structure provided with a skew on the stator iron core has not been used from viewpoints of the connection line of coil on the stator iron core, the assembling ability, and the like. Therefore, as shown in a graph of FIG. 6 showing the relationship between cogging torque and electrical angle, when the energization of each stator iron core is switched over, a high cogging torque is produced on the rotor. It is urgent to solve this problem.

SUMMARY OF THE INVENTION

The present invention has been made to solve the above-described problems, and accordingly an object of the present invention is to provide an axial gap electronic motor capable of decreasing cogging torque and thus decreasing vibrations and noise.

To achieve the above object, the present invention has some features described below. First, the invention of a first aspect is characterized in that in an axial gap electronic motor in which a stator and a rotor are arranged oppositely along the rotation axis direction of the rotor with a predetermined gap being provided therebetween, the stator has a magnetic force generating section in which a plurality of stator iron cores consisting of magnetic bodies are arranged in a ring shape on a concentric circle with the rotation axis line of the rotor being the center axis, each of teeth of the stator iron core is provided with a skew. According to this invention, the teeth of stator iron core are provided with a skew, by which the occurrence of cogging torque is reduced, so that the vibrations and noise of rotor can be decreased.

The invention of a second aspect is characterized in that the skew is inclined in the positive direction or the reverse direction with respect to the rotation direction of the rotor. According to this invention, even if the skew is inclined in either the positive direction or the reverse direction with respect to the rotation direction of the rotor, the operation and effects thereof can be achieved.

The invention of a third or fourth aspect is characterized in that a gap surface in which the teeth of the stator iron core face to each other has an arcuate shape or a shape formed by combining an arcuate shape and a straight line shape. According to this invention, the gap surface in which the teeth of the stator iron core face to each other has an arcuate shape or a shape formed by combining an arcuate shape and a straight line shape, so that vibrations caused by cogging torque can be decreased.

The invention of a fifth aspect is characterized in that the stator iron core is formed by casting. According to this invention, the stator iron core is formed by casting, so that the stator iron core can be manufactured at a lower cost.

The invention of a sixth aspect is characterized in that an edge of gap surface of each of the teeth is formed on an outside diameter line of the stator iron core. According to this invention, since the outside diameters of teeth are aligned on the outside diameter line, an increase in cogging torque can be prevented without projection of a part of stator iron core.

The inventions of seventh, eighth, and ninth aspects are characterized in that the stator consists of the nine teeth arranged in a ring shape, and the number of poles of the rotor is eight; and further a skew angle of the teeth is 2° or larger and/or 7° or smaller. According to these inventions, by making the skew angle of the general axial gap electronic motor having 9 slots and 8 poles 2° or larger, the cogging torque can be decreased. Also, by making the skew angle 7° or smaller, the energy conversion efficiency can be kept high.

The inventions of tenth, eleventh, and twelfth aspects are characterized in that the stator consists of the twelve teeth arranged in a ring shape, and the number of poles of the rotor is eight; and further a skew angle of the teeth is 4° or larger and/or 9° or smaller. According to these inventions, by making the skew angle of the axial gap electronic motor having 12 slots and 8 poles 4° or larger, the cogging torque can be decreased. Also, by making the skew angle 9° or smaller, the energy conversion efficiency can be kept high.

DETAILED DESCRIPTION

Figure 1:
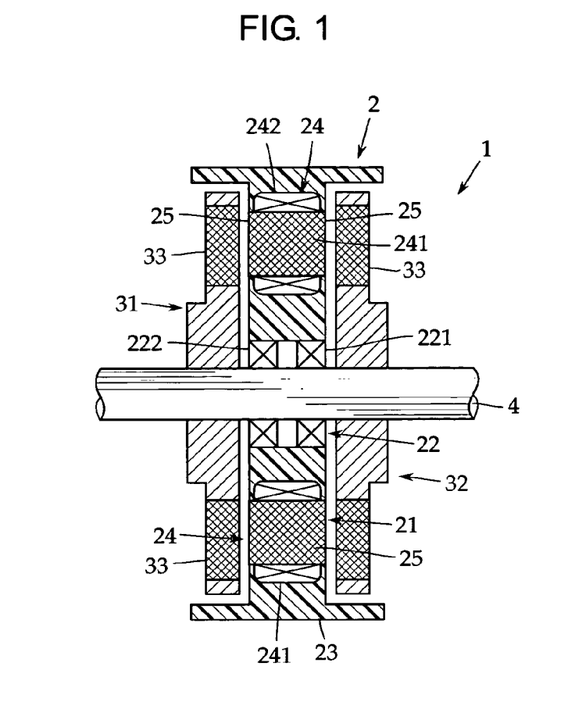
FIG. 1 is a sectional view of a principal portion, schematically showing a structure of an axial gap electronic motor in accordance with one embodiment of the present invention.

An embodiment of the present invention will now be described with reference to the accompanying drawings. FIG. 1 is a sectional view of a principal portion of an axial gap electronic motor in accordance with one embodiment of the present invention.

This axial gap electronic motor 1 has a stator 2 formed in a disc shape and a pair of rotors 31 and 32 arranged opposedly on both side surfaces of the stator 2 with a predetermined gap provided between the stator and the rotor. The rotors 31, 32 are fixed coaxially to a rotor output shaft 4 for outputting a rotational driving force. In this embodiment, the axial gap electronic motor 1 is a permanent magnet motor in which the rotors 31 and 32 each have a permanent magnet 33.

In this embodiment, the rotors 31, 32 are arranged on both sides of the stator 2, but it may be arranged either one side thereof. In the present invention, the configuration of the rotors 31, 32 is arbitrary, so that the explanation thereof is omitted.

Various mechanisms including the stator 2 and rotors 31 and 32 are actually housed in a bracket, not shown, and the periphery of the stator 2 is fixed to the bracket.

Figure 2:
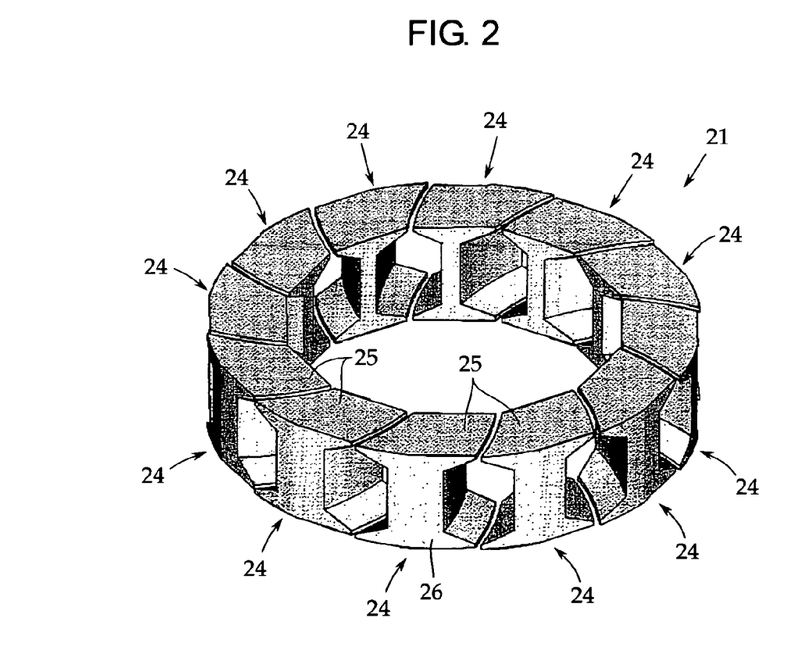
FIG. 2 is a perspective view of a stator iron core of the axial gap electronic motor shown in FIG. 1.

As shown in FIG. 2, the stator 2 has a magnetic force generating section 21 formed in a ring shape (what is called a doughnut shape) and a bearing section 22 arranged in the center of the magnetic force generating section 21 as bearing means with respect to the rotor output shaft 4. The magnetic force generating section 21 and the bearing section 22 are molded integrally using a synthetic resin 23.

The magnetic force generating section 21 consists of a plurality of stator iron cores 24 arranged in a ring shape along a concentric circle with the output shaft 4 being the center axis. In this embodiment, the magnetic force generating section 21 is formed so as to be opposed to the magnet portions 33 of the rotors 31 and 32.

The bearing section 22 has a pair of radial ball bearings 221 and 222, which are arranged coaxially at a predetermined interval with the rotor output shaft 4 being the center axis. In this embodiment, the output shaft 4 is pivotally supported by the two radial ball bearings 221 and 222. However, the output shaft 4 may be supported by only one radial ball bearing.

In this embodiment, the rotors 31 and 32 are connected to each other so as to be rotated synchronously by the rotor output shaft 4. Besides, the present invention may be applied to a type in which the rotors 31 and 32 are directly supported by the stator 2 via a radial bearing without the provision of the rotor output shaft 4 (what is called a shaft-less type).

Figure 3A:
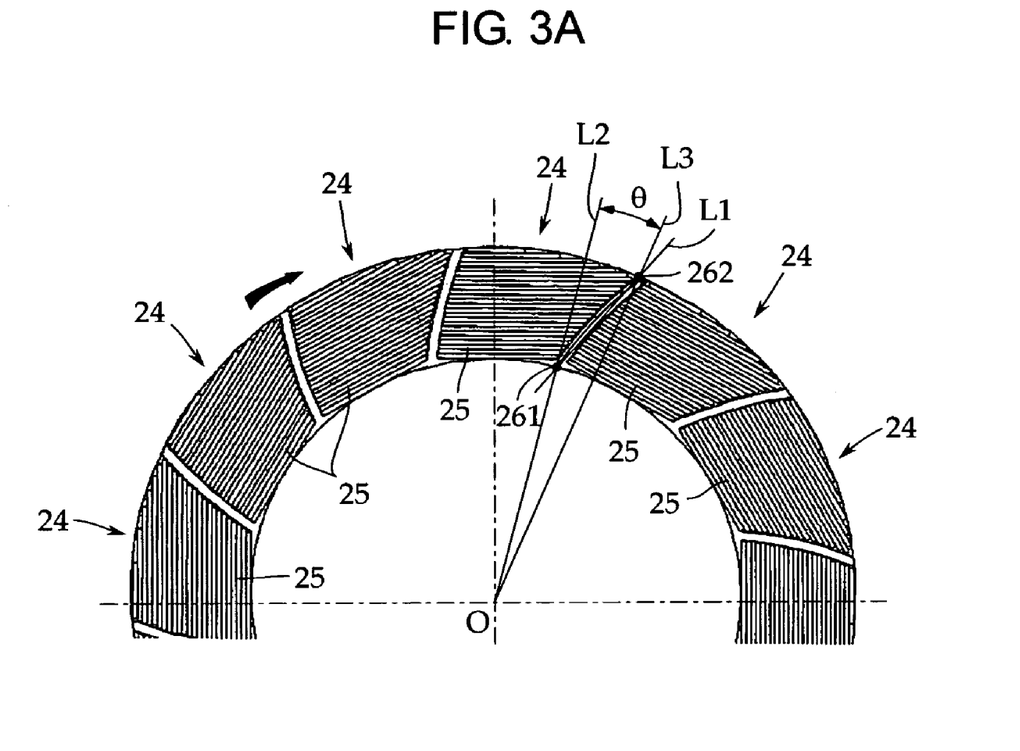
FIG. 3A is a partial front view, in which the stator iron core is viewed from the front side.
Figure 3B:
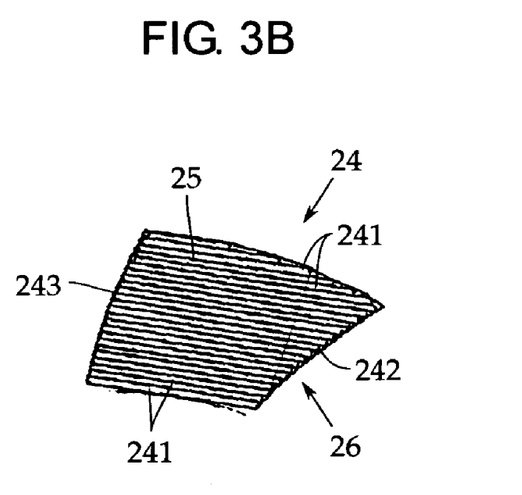
FIG. 3B is an enlarged front view of the stator iron core.
Figure 3C:
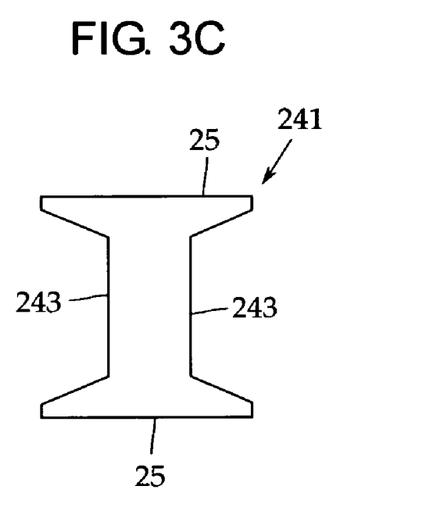
FIG. 3C is a front view of a magnetic steel sheet of the stator iron core.

Next, a specific shape of the stator iron core 24 is explained. FIG. 2 is a perspective view showing a state in which the stator iron cores 24 of the magnetic force generating section 21 are taken out. FIGS. 3A to 3C show a structure of the stator iron core 24.

In this embodiment, for the stator iron core 24, the number of teeth 25 is 12, and the number of poles is 8, the teeth 25 and the poles being arranged at a predetermined pitch. The number of stator iron cores 24 and the number of poles can be defined so that the number of poles is 2n (n is a positive integer) with respect to the number of stator iron core of 3n. If this definition is satisfied, the number thereof is not subject to any special restriction.

As shown in FIG. 3C, each of the stator iron cores 24 consists of a laminated body in which a plurality of magnetic steel sheets 241 each having an H-shaped cross section are laminated in the radial direction of the center axis O. At both ends in the axial direction of the magnetic steel sheets 241, the teeth 25 facing to the magnets 33 of the rotors 31 and 32 are formed. In the central portion of the magnetic steel sheet 241, a concave portion 243 for forming a bobbin (not shown) for winding a coil 242 is formed.

In this embodiment, the stator iron core 24 consists of the laminated body of magnetic steel sheets. Besides, the stator iron core 24 may be formed integrally by casting. Such a mode is also embraced in the present invention.

The stator iron cores 24 have the same shape, and are arranged in a ring form to constitute one magnetic force generating section 21. Therefore, in the explanation given below, only one stator iron core 24 is explained, and the explanation of other stator iron cores is omitted because all of the stator iron cores are the same.

As shown in FIG. 3B, gap surfaces 242 and 243 in which the teeth 25 of the stator iron cores 24 face to each other are provided with a skew 26. The skew 26 is inclined in the positive direction with respect to the rotation direction of the rotor 31, 32 (the direction indicated by an arrow in FIG. 3A). The skew 26 may be inclined through a predetermined angle with respect to the radial direction with the rotation axis of the rotors 31, 32 being the center axis.

When a centerline between the teeth 25 of the stator iron cores 24 is taken as L1, an imaginary line connecting an intersection 261 of the centerline L1 and an inside diameter line of the stator iron core 24 to the center axis O is taken as L2, and an imaginary line connecting an intersection 262 of the centerline L1 and an outside diameter line of the stator iron core 24 to the center axis O is taken as L3, the skew 26 has a relative angle of the imaginary line L3 with respect to the imaginary line L2 (skew angle: θ). In this embodiment, the skew angle is set so as to be θ=5°.

Although the skew 26 is provided in the positive direction with respect to the rotation direction of the rotors 31, 32, it may be provided in the reverse direction. Even if the skew 26 is provided in the reverse direction, the same effects can be achieved. Such a mode is also embraced in the present invention.

The gap surface 242 is formed in an arcuate shape along the skew 26. The gap surface 243 that is opposed to the gap surface 242 is also formed in an arcuate shape. According to this configuration, the occurrence of cogging torque can be restrained effectively.

Figure 4:
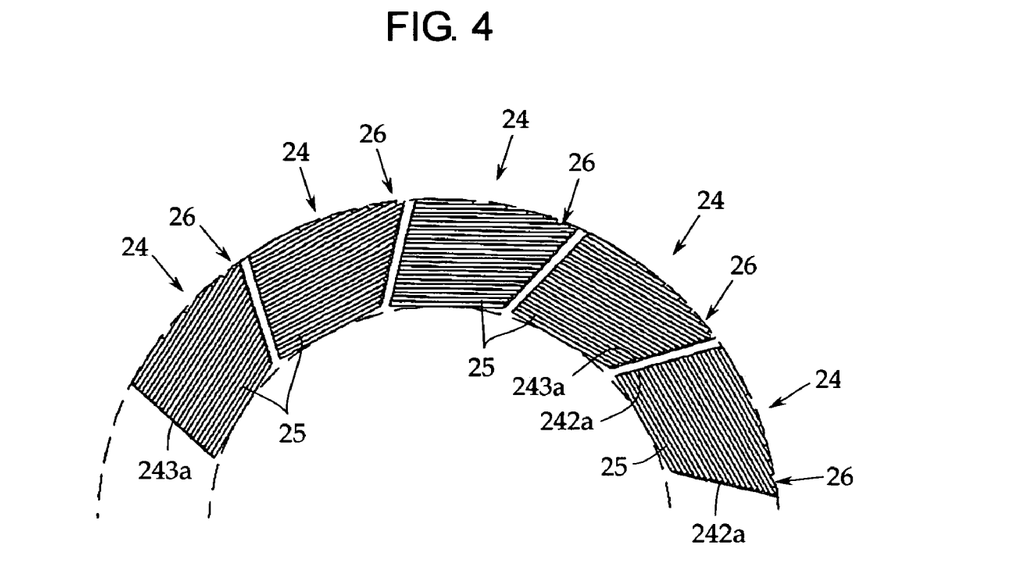
FIG. 4 is a front view for illustrating a modification of the stator iron core.
Figure 5:
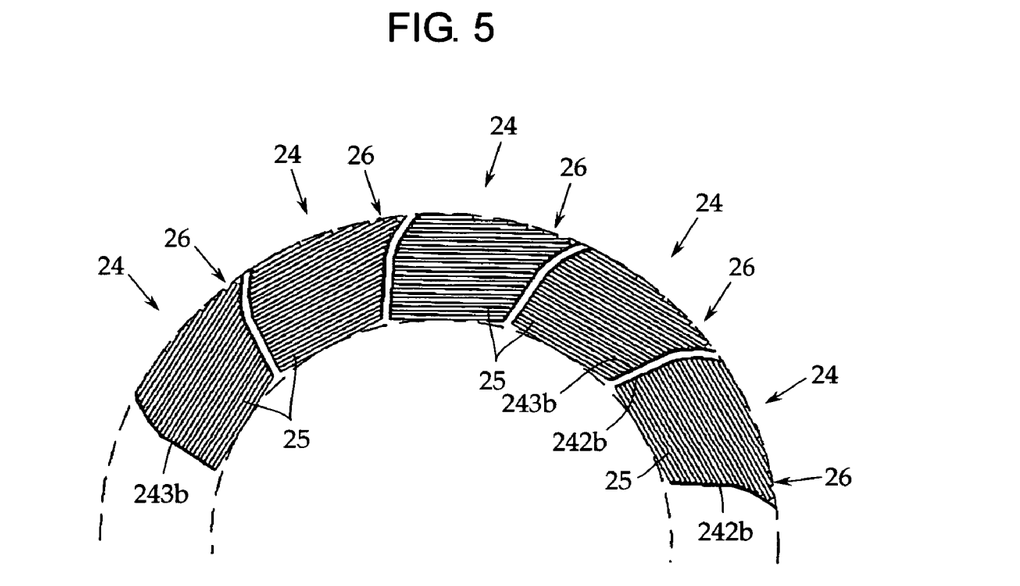
FIG. 5 is a front view for illustrating a modification of the stator iron core.

Although the gap surfaces 242 and 243 each are formed in an arcuate shape in this embodiment, gap surfaces 242a and 243a each may have a straight line shape as shown in FIG. 4. Also, as shown in FIG. 5, gap surfaces 242b and 243b each may be a surface formed by combining an arcuate surface and a straight line surface. Such modes are also embraced in the present invention.

Next, specific examples of the present invention are compared with a comparative example. For the examples, two types of axial gap electronic motors having different specifications were used. A first axial gap electronic motor of a type having 9 slots and 8 poles and a second axial gap electronic motor of a type having 12 slots and 8 poles were prepared.

The implementation procedure is as described below. First, in a state in which an input current value, etc., was controlled so that the output condition of each motor was fixed, motor parameters such as magnetic properties were measured by changing the skew angle of the stator iron core. The analysis of magnetic field was carried out by using analysis software JMAG-Studio (Ver. 7.2) made by Japan Research Institute.

The skew angles θ of the motors are as follows:
[12 slots, 8 poles] 2.5°, 4.5°, 6.1°, 7.7°, 8.9°, 13°
[9 slots, 8 poles] 1.83°, 3.31°, 4.82°, 6.35°, 9.55°, 13.3°

Further, in addition to the above-described skew angles, measurement was made for the case of no skew angle (skew angle: 0°) as a comparative example. The measurement results are as follows.

<12 slots, 8 poles>

Figure 7:
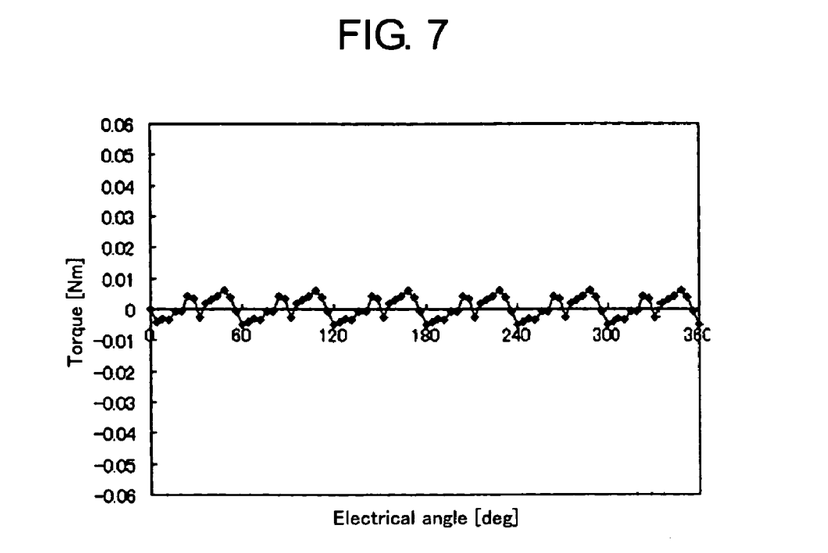
FIG. 7 is a graph showing the relationship between cogging torque and electrical angle in the case where a skew angle θ=7.7° in a first example (12 slots, 8 poles)

FIG. 7 is a graph showing the relationship between cogging torque [Nm] and electrical angle [deg] when the skew angle θ=7.7° in the case of 12 slots and 8 poles. From FIG. 7, it can be clearly seen that if a skew angle is provided to a stator iron core, the cogging torque is kept as low as about one-fifth as compared with the case of no skew (θ=0°) in FIG. 6.

Figure 8:
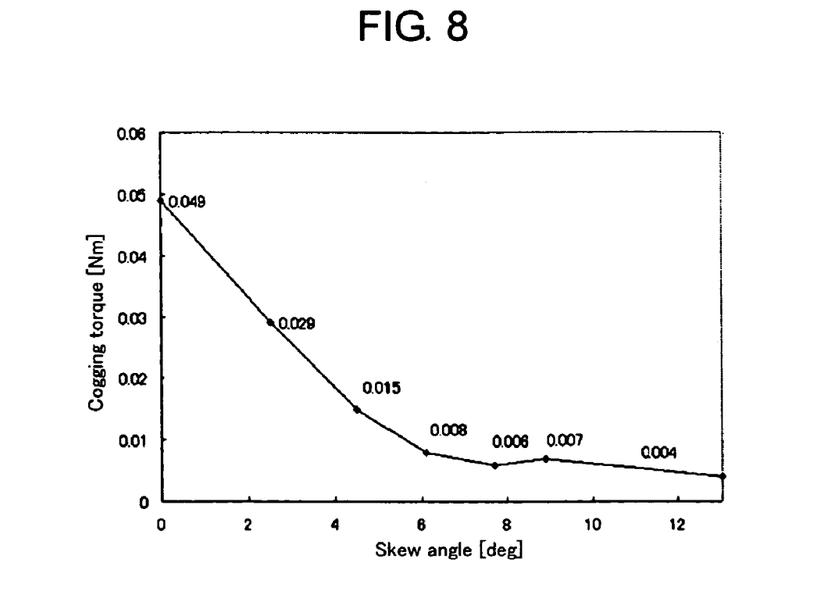
FIG. 8 is a graph showing the relationship between cogging torque and skew angle in a first example (12 slots, 8 poles)

FIG. 8 shows peak cogging torque with respect to respective skew angles. According to this graph, the cogging torque decreases with increasing skew angle θ, and the effect is most remarkable at a skew angle θ of about 4° or larger.

Figure 12:
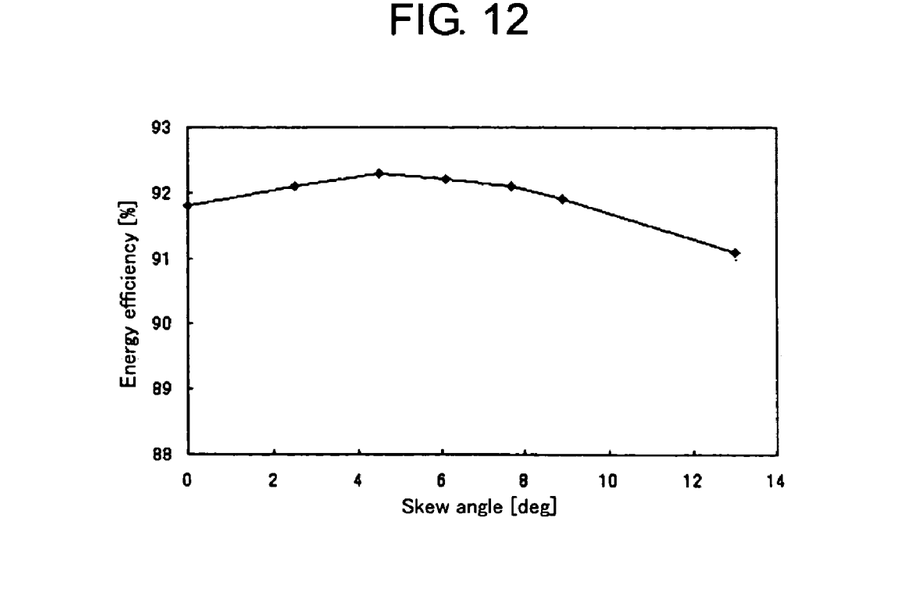
FIG. 12 is a graph showing the relationship between skew and energy efficiency for 12 slots and 8 poles.

As shown in FIG. 12, if the skew angle is too large, the energy conversion efficiency decreases inversely. Therefore, considering the energy conversion efficiency, the skew angle should preferably be set at 9° or smaller.

<9 slots, 8 poles>

Figure 9:
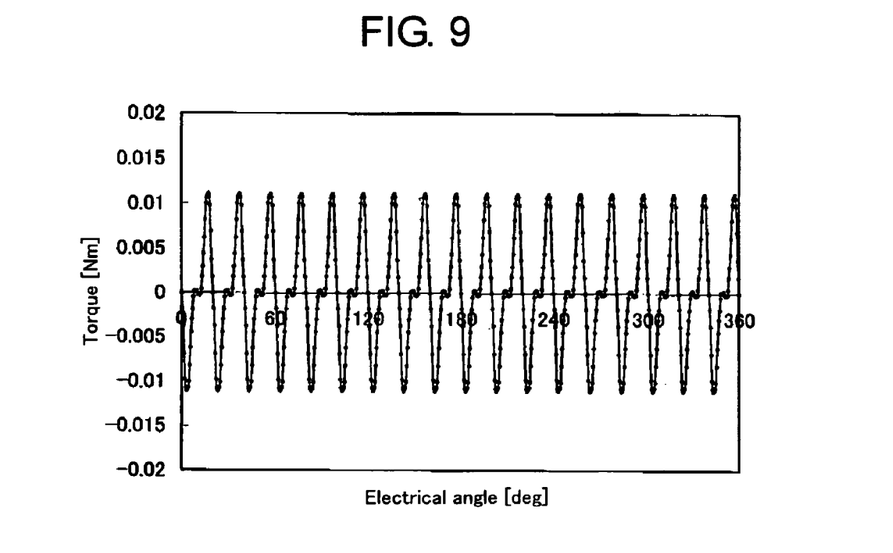
FIG. 9 is a graph showing the relationship between cogging torque and electrical angle in the case of no skew angle in a second example (9 slots, 8 poles)
Figure 10:
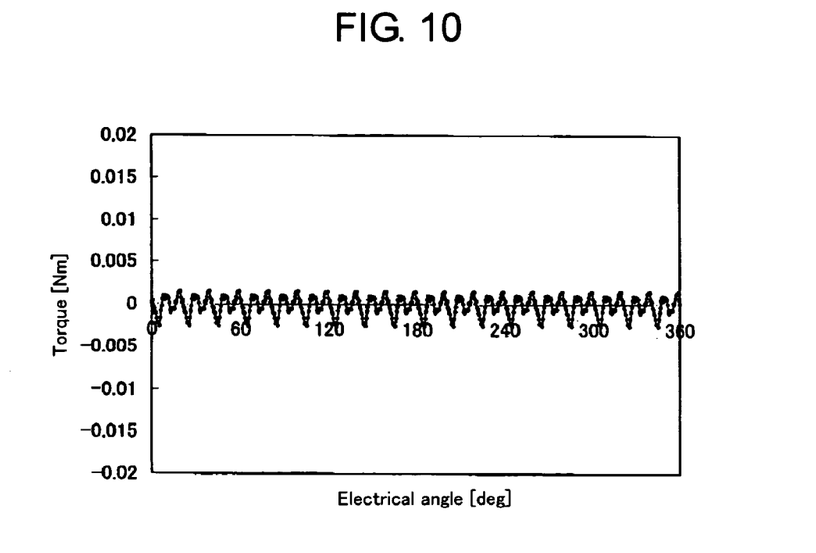
FIG. 10 is a graph showing the relationship between cogging torque and electrical angle in the case where a skew angle θ=4.8° in a third example (9 slots, 8 poles)

FIG. 10 is a graph showing the relationship between cogging torque [Nm] and electrical angle [deg] when the skew angle θ=4.8° in the case of 9 slots and 8 poles. As shown in FIG. 10, in this case as well, it can be seen that by setting the skew angle θ, the cogging torque is made as low as about one-tenth as compared with the case of no skew (θ=0°) in FIG. 9.

Figure 11:
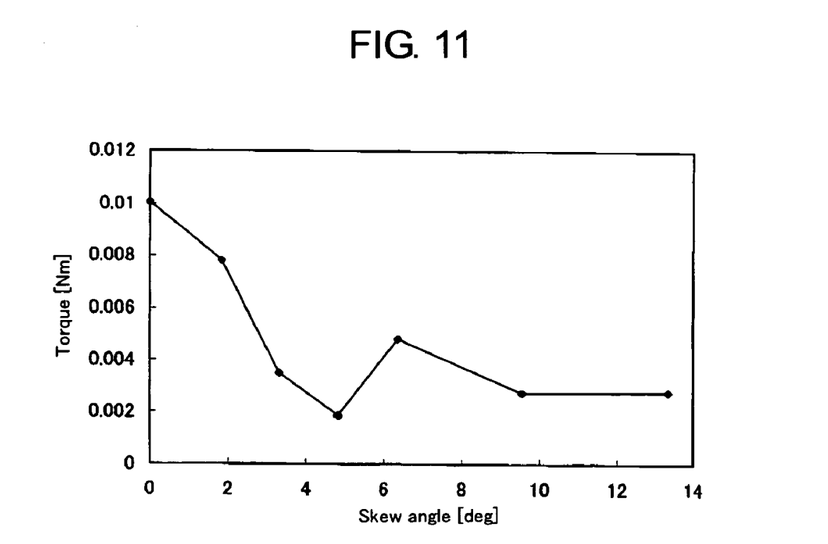
FIG. 11 is a graph showing the relationship between cogging torque and skew angle in a fourth example (9 slots, 8 poles)

FIG. 11 shows peak cogging torque with respect to respective skew angles. According to this graph, the cogging torque decreases inversely with increasing skew angle θ. If the skew angle θ is 2° or larger, an effect of reducing cogging torque to about a half as compared with the case of no skew is achieved.

Figure 13:
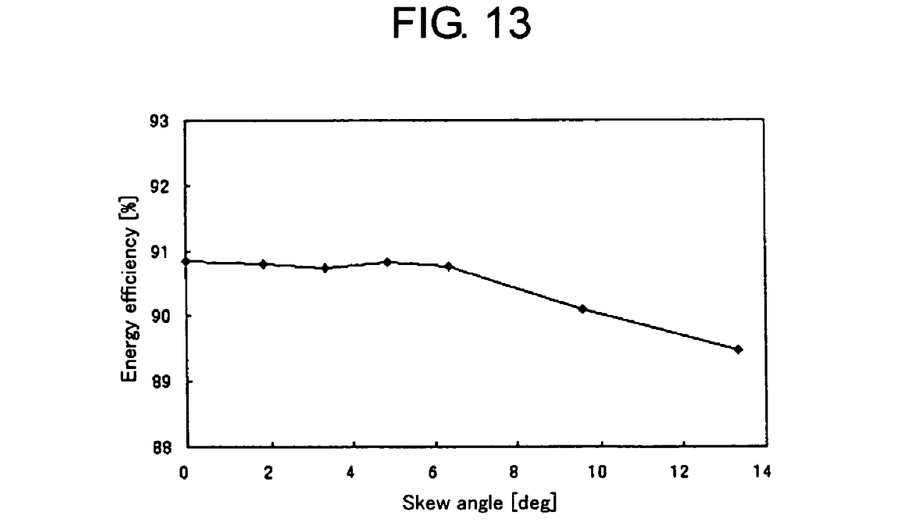
FIG. 13 is a graph showing the relationship between skew and energy efficiency for 9 slots and 8 poles.

As shown in FIG. 13, if the skew angle is too large, the energy conversion efficiency decreases inversely. Therefore, considering the energy conversion efficiency, the skew angle should preferably be set at 7° or smaller.

The above-described results reveal that in this embodiment, the cogging torque decreases as the skew angle θ of stator iron core is set larger. Also, in the case of 12 slots and 8 poles, the cogging torque is decreased significantly by setting the skew angle θ at 4° to 9°. In the case of 9 slots and 8 poles, the cogging torque is at least halved by setting the skew angle θ at 2° to 7°.

The above is an explanation of the preferred embodiment of the present invention given with reference to the accompanying drawings. The present invention is not limited to this embodiment. Various changes and modifications that may be made in the scope of technical concept described in the following claims by those skilled in the art who are engaged in the field of the axial gap electronic motor and have ordinary technical knowledge are naturally embraced in the technical scope of the present invention.

The invention claimed is:

1. The axial gap electronic motor comprising:
a stator and a rotor arranged opposedly along a rotation axis direction of said rotor with a predetermined gap provided therebetween,
wherein said stator has a magnetic force generating section in which a plurality of stator iron cores formed of magnetic bodies is arranged in a ring shape on a concentric circle with the rotation axis line of said rotor being a center axis, each of teeth of said stator iron core is provided with a skew, and
wherein a gap surface in which the teeth of said stator iron core face to each other has an arcuate shape.

2. The axial gap electronic motor according to claim 1, wherein said skew is inclined in one of the same direction and the reverse direction with respect to the rotation direction of said rotor.

3. The axial gap electronic motor according to claim 1, wherein an edge of the gap surface of each of said teeth is formed on an outside diameter line of said stator iron core.

4. The axial gap electronic motor comprising:
a stator and a rotor arranged opposedly along a rotation axis direction of said rotor with a predetermined gap provided therebetween,
wherein said stator has a magnetic force generating section in which a plurality of stator iron cores formed of magnetic bodies is arranged in a ring shape on a concentric circle with the rotation axis line of said rotor being a center axis, each of teeth of said stator iron core is provided with a skew, and
wherein a gap surface in which the teeth of said stator iron core face to each other has a shape formed by combining an arcuate shape and a straight line shape.

5. An axial gap electronic motor comprising:
a stator having a plurality of poles, each pole being formed of a stator iron core made of a magnetic body and a coil wound therearound, and
a rotor having a plurality of poles formed of permanent magnet and arranged opposedly to the stator along a rotation axis direction of said rotor with a predetermined gap provided therebetween,
wherein said stator has a magnetic force generating section in which a plurality of said stator iron cores is arranged in a ring shape on a concentric circle with the rotation axis line of said rotor being a center axis, each of teeth of said stator iron core is provided with a skew, and
wherein said stator consists of said nine stator iron cores arranged in the ring shape, and the number of poles of said rotor is eight.

6. The axial gap electronic motor according to claim 5, wherein a skew angle of said teeth is 2° or larger.

7. The axial gap electronic motor according to claim 5, wherein a skew angle of said teeth is 7° or smaller.

8. An axial gap electronic motor comprising:
- a stator having a plurality of poles, each pole being formed of a stator iron core made of a magnetic body and a coil wound therearound, and
- a rotor having a plurality of poles formed of permanent magnet and arranged opposedly to the stator along a rotation axis direction of said rotor with a predetermined gap provided therebetween,
- wherein said stator has a magnetic force generating section in which a plurality of said stator iron cores is arranged in a ring shape on a concentric circle with the rotation axis line of said rotor being a center axis, each of teeth of said stator iron core is provided with a skew, and
- wherein said stator consists of twelve stator iron cores arranged in the ring shape, and the number of poles of said rotor is eight.

9. The axial gap electronic motor according to claim 8, wherein a skew angle of said teeth is 4° or larger.

10. The axial gap electronic motor according to claim 8, wherein a skew angle of said teeth is 9° or smaller.

* * * * *